United States Patent

Neumeier

[15] 3,680,906

[45] Aug. 1, 1972

[54] REMOVABLE EYE BOLT FOR LIFTING HEAVY OBJECTS

[72] Inventor: Karl E. Neumeier, Stillwater, Minn.

[73] Assignee: Programmed & Remote Systems Corporation, St. Paul, Minn.

[22] Filed: Oct. 12, 1970

[21] Appl. No.: 79,731

[52] U.S. Cl. .................................294/89, 294/83 AA
[51] Int. Cl. .................................................B66c 1/00
[58] Field of Search ............294/83 R, 83 AA, 86, 89

[56] References Cited

UNITED STATES PATENTS 3,242,666  3/1966  Peterson .................294/83 AA

FOREIGN PATENTS OR APPLICATIONS 999,389  1/1952  France .....................294/83 AA Primary Examiner—Richard E. Aegerter
Assistant Examiner—I. Kenneth Silverman
Attorney—Dugger, Peterson, Johnson & Westman

[57] ABSTRACT

A removable eye bolt assembly for lifting heavy objects and in particular large liner sections for rotating ball or roller mills, wherein the eye bolts must be removed when the liners are in use, and must be inserted very securely when used so that they don't come out. The liner sections being lifted are extremely heavy. The liners are usually cast and the present structure shows a connecting device that is safe and secure even though the mounting openings for the device may be cast in place.

6 Claims, 4 Drawing Figures

PATENTED AUG 1 1972

INVENTOR.
KARL E. NEUMEIER
BY
ATTORNEYS

REMOVABLE EYE BOLT FOR LIFTING HEAVY OBJECTS

BACKGROUND OF THE INVENTION

1. Field of the Invention

The present invention relates to a support bolt assembly that can be removed and replaced into the object to which it is attached.

2. Prior Art

Removable eye bolt assemblies or couplers have been known in the art. For example, U.S. Pat. No. 3,405,967 shows a safety coupler for mechanisms that requires quite precise machining for operation, and this raises the cost of operation.

Further, the actuation of the device between its retractive position and its working position or engaged in locking position is not positive and if the locking opening is not the proper size, difficulties could be encountered.

A cam operated locking device used in a well tool is shown in U.S. Pat. No. 2,179,594.

These structures are typical of the devices of usual types of cam locking members that are not positively held in place and which cannot be locked securely for all operations.

SUMMARY OF THE INVENTION

The present device relates to a lift stud or bolt member that can be placed into a cast opening in large objects such as mill liner handlers or the like and which has radially moving balls that fit into receptacles in the object to be lifted. The actuating means in the present device is a crew actuated cam that can be threaded to expand the balls radially outwardly without placing bending loads on the cam and which is securely tightened in place so that the lift stud cannot be removed and will not work loose after it is tightened into place.

The unit has a square shank housing to prevent rotation of the device as the screw cam is being tightened. The screw cam locks against a surface of the cam housing so that the device can be securely frictionally locked.

DESCRIPTION OF THE PREFERRED EMBODIMENT

A removable locking and lifting bolt assembly shown generally at 10 is mounted in a mill liner section 11, or some similar heavy object. The mill liners are mounted on the interior of heavy ball and roller mills, such as those used for grinding Taconite, and have to be replaced from time to time. One of the problems of course is getting secure fastening on the liner and still have a fastener that is removable so that it can be removed when the liner is in use in the mill. The bolt is used with a mill liner handler, such as that shown in U.S. Pat. application Ser. No. 69,529 filed Sept. 4, 1970 which is known to this applicant. The lifting device is described as an eye bolt herein, but it could be a stud or hook is desired.

Figure 4:
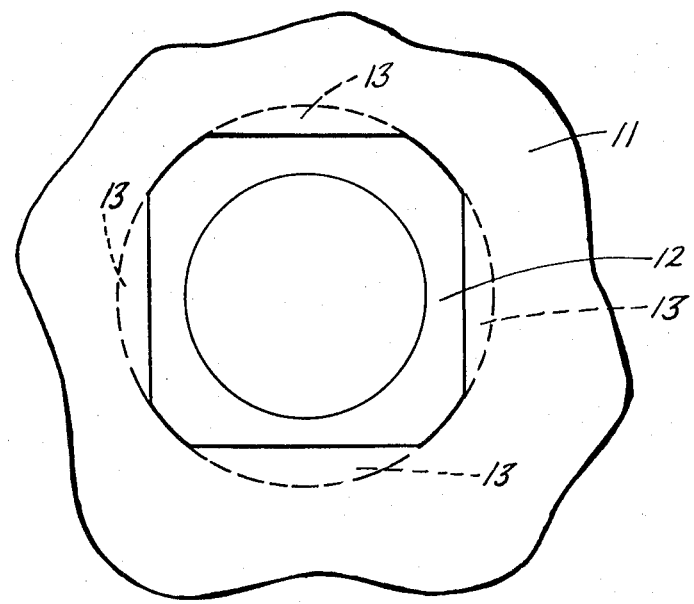
FIG. 4 is a fragmentary top plan view of the opening in the mill liner section in which the eye bolt is inserted.

The locking bolt assembly as shown is fitted within an opening 12 that is formed in the mill liner section 11, when the liner section is cast, and the opening, as shown perhaps best in FIG. 4 is partial square, with rounded corners, with an interior annular ring or groove 13 located spaced down from the upper surface of the mill liner section. The corners of the square (rectilinear) opening are rounded as shown to the same size as the annular groove 13. Its maximum diagonal direction is defined by the diameter of the annular groove 13. This forms four groove portions 13, one aligned with each surface of the parallel sides of the rectilinear opening.

The eye bolt assembly 10 comprises an outer housing 14 that as shown is the same cross sectional shape as the main opening 12 in the mill liner 11, and is a part square shanked housing having rounded corners to fit within the opening. The parallel sides of the housing are of size to slide within the parallel sides of the opening 12, and the maximum diagonal dimension is just slightly smaller thAn the diameter of the annular groove 13. The housing 14, as shown, has cross bores comprising openings 15 that are bored along axes at right angles to the parallel faces of the housing, and suitable lock balls 16 are mounted in these openings 15 so that there are four lock balls mounted in the housing. Small shoulder 17 are formed in each of the opening 15 to keep the balls from going inwardly beyond a certain position, and similar shoulders, or stop members may be used on the outer edge of opening 15 to keep the balls retained in the opening.

The housing has a central axial bore or opening 19. The upper end of the housing is internally threaded as at 18, and the bore 19 extends downwardly and opens to the openings 15 for the balls 16. The balls 16 will project partially into bore 19 when the balls are back against shoulder 17.

Figure 1:
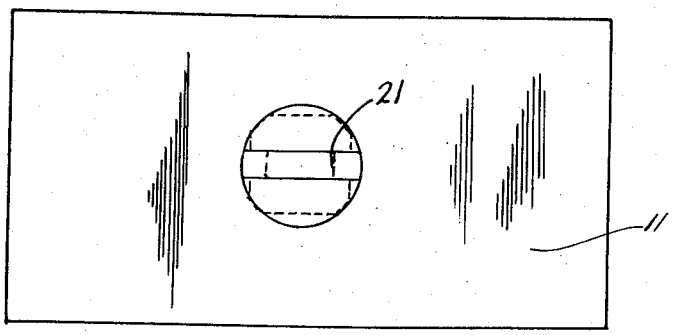
FIG. 1 is a top plan view of a mill liner section showing an eye bolt assembly made according to the present invention and installed therein.
Figure 2:
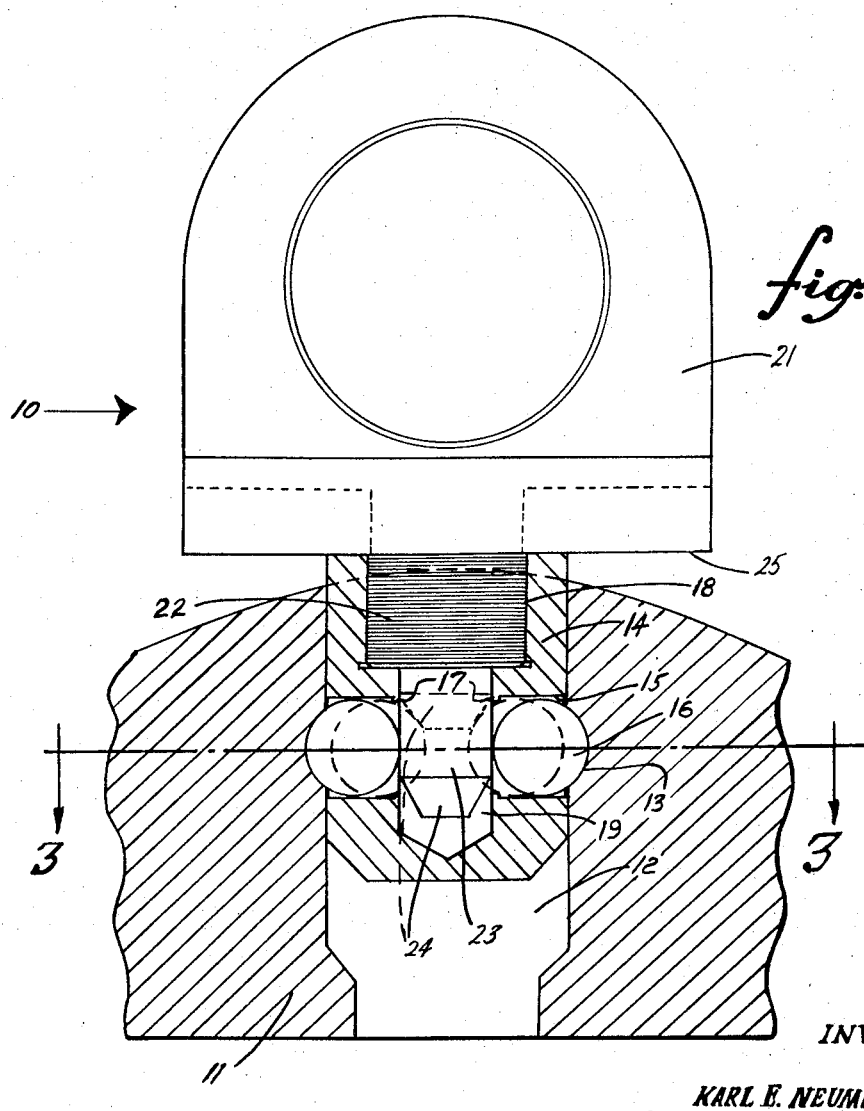
FIG. 2 is a side elevational view of the eye bolt assembly of FIG. 1 with parts in section and parts broken away.

A lock bolt 21 has a threaded shank 22, and an axially extending pin portion 23 with a cam end 24. The bolt 21 is threadably mounted in the threads 18 and can be moved in and out between a solid line position as shown in FIG. 2 wherein the balls 16 are forced outwardly beyond the periphery of the housing 14, by the cam and pin to its dotted line position as shown in FIG. 2 wherein the balls can move inwardly along the cam portion 24 (which is an annular frusto-conical surface) partially retracted into the bore 19 so that the housing can be slid in and out of the opening 12.

The device is made so that when the eye bolt assembly is to be removed from the mill liner 11, the locking pin 21 is threaded outwardly to itS dotted line position so that the balls 16 can be moved inwardly, and then the outer periphery of the balls will clear the inner edges of the opening 12 and the housing and eye bolt assembly can be pulled outwardly easily.

Figure 3:
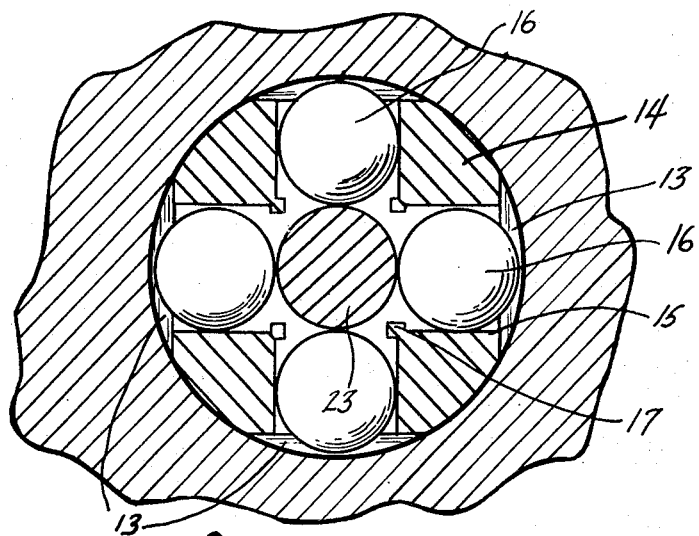
FIG. 3 is a sectional view taken as on line 3—3 in FIG. 2.

When it is to be replaced, the housing is slid into place, and because of the square opening 12 and the matching configuration of the housing, the bolt can be screwed tightly without turning the housing to force the balls 16 outwardly into the groove portions 13 (there are four groove portions shown in FIG. 3) so that the balls are locked positively out by the pin portion 23 of the bolt. The bolt has an eye at its outer end, but this could be replaced by a hook, stud or the like. It should be noted that the housing 14 is of length so that it extends above the upper surface of the mill liner section when it is fully seated, and the under surface 25 of the eye bolt head will tighten down against the upper surface of the housing as the bolt is screwed tightly so that tight lock is obtained, and the locking or tightening is not dependent upon compression against the object to be lifted such as the mill liner section 11. This means that large levers can be used for tightening the locking device down securely so that it cannot come loose even through heavy loads may be utilized.

Further, the annular groove portion 13 can be made with a fair amount of tolerance to it so that the opening in the mill liner can be cast in place without having expensive drilling or machining operations.

The annular cam 24 operates about a center axis so that the load is transferred directly without putting a tensile load or bending load on the tapered cam portion 24. The cam can thus be made of a very hard material without regard to brittleness and it can be replaceable if desired. The entire cam pin can be replaced from the shank of the eye bolt. Thus the device has a positive threaded lock that gives a good tight lock to prevent it from jiggling loose, working loose, or failing under load. The device is easy to manufacture and relatively low in cost while giving positive high load bearing capabilities.

What is claimed is:

1. An attachable assembly used for lifting heavy objects comprising a heavy object, an opening defined in said object, said opening opening up to a first surface of said object, internal receptacle means defined in said object and extending to the interior surface defining said opening, said receptacle means being spaced from the outer surface of said object, a locking assembly fitting within said opening, said locking assembly comprising a housing, said housing having an axial passageway and a plurality of lock passageways, said lock passageways opening to the axial passageway and extending to the outer periphery of said housing and positioned to align with said receptacle means in said heavy object when said housing is seated therein, locking means movable in said lock passageways in said housing to a first position to partially enter said receptacle means and movable to a second position to clear said receptacle means, and a lifting member threadably mounted directly to said housing for threadable movement axially along said axial passageway including cam means positioned in said axial passageway to move said locking means outwardly from said housing when the lifting member is threaded to a first position to hold said locking means in position partially in said receptacle means under force developed by the threadable mounting and said cam means until the lifting member is threaded outwardly.

2. The combination as specified in claim 1 wherein said locking means comprises balls movable in said locking passageways into partial engagement with said receptacle means, and said lifting member cam means comprises a frusto-conical cam forming the end of said lifting member co-axial with the axis of said housing, acting on said balls to force said balls outwardly as said lifting member is threaded axially inward.

3. The combination as specified in claim 1 wherein said opening in said object comprises surfaces defining said opening which are oriented to have at least one surface portion positioned at a different radial distance from the axis of the opening than other surface portions.

4. The combination as specified in claim 3 wherein said housing has outer surfaces mating with said surface portions defining said opening in said object so that said housing is prevented from rotation about its axis as said lifting member is threaded into said housing.

5. The combination as specified in claim 1 wherein said housing has an end surface surrounding said axial passageway, and said lifting member has a surface portion mating with and frictionally engaging said end surface of said housing to frictionally lock said lifting member from reverse threading when the lifting member is in its first position.

6. The combination as specified in claim 5 wherein said opening in said object and said housing are rectilinear in cross section so that said lifting member can be rotationally threadably tightened under force without causing said housing to turn in said opening in said object.

* * * * *